United States Patent
Chan

(10) Patent No.: US 9,235,247 B2
(45) Date of Patent: Jan. 12, 2016

(54) AUDIO SIGNAL CONTROL OF ELECTRICAL OUTLET STRIP

(71) Applicant: Shuen Yung Chan, New York, NY (US)

(72) Inventor: Shuen Yung Chan, New York, NY (US)

(*) Notice: Subject to any disclaimer, the term of this patent is extended or adjusted under 35 U.S.C. 154(b) by 109 days.

(21) Appl. No.: 14/242,045

(22) Filed: Apr. 1, 2014

(65) Prior Publication Data
US 2014/0334640 A1    Nov. 13, 2014

Related U.S. Application Data

(60) Provisional application No. 61/821,050, filed on May 8, 2013.

(51) Int. Cl.
| | | |
|---|---|---|
| *H03G 5/00* | (2006.01) | |
| *G06F 1/26* | (2006.01) | |
| *H01R 13/66* | (2006.01) | |
| *H01R 25/00* | (2006.01) | |
| *H01R 13/70* | (2006.01) | |
| *H01R 13/703* | (2006.01) | |
| *H01R 24/22* | (2011.01) | |
| *H02H 7/10* | (2006.01) | |
| *H02J 13/00* | (2006.01) | |

(52) U.S. Cl.
CPC .............. *G06F 1/266* (2013.01); *H01R 13/665* (2013.01); *H01R 13/701* (2013.01); *H01R 13/7038* (2013.01); *H01R 24/22* (2013.01); *H01R 25/003* (2013.01); *H02H 7/10* (2013.01); *H02J 13/00* (2013.01)

(58) Field of Classification Search
None
See application file for complete search history.

(56) References Cited

U.S. PATENT DOCUMENTS

| | | | | | |
|---|---|---|---|---|---|
| 2,869,699 | A | * | 1/1959 | Bochan | D06F 37/40 192/104 C |
| 8,085,163 | B1 | * | 12/2011 | Wells | A63J 17/00 381/56 |
| 8,106,541 | B1 | * | 1/2012 | Sarullo | H01R 25/006 307/139 |
| 8,487,765 | B1 | * | 7/2013 | Jordan, II | G06F 1/266 307/116 |
| 8,614,632 | B1 | * | 12/2013 | Wells | H05B 33/0857 340/331 |
| 2002/0154787 | A1 | * | 10/2002 | Rice | H04R 29/008 381/124 |
| 2011/0169342 | A1 | * | 7/2011 | Tinaphong | H01R 13/6683 307/126 |
| 2014/0098445 | A1 | * | 4/2014 | Hooper | H02H 3/16 361/42 |
| 2015/0077243 | A1 | * | 3/2015 | Hooper | H02H 3/16 340/532 |

* cited by examiner

*Primary Examiner* — Thang Tran

(57) ABSTRACT

An electrical outlet strip is controlled by sound or an audio signal. The electrical outlet strip can include a plurality of outlets having a selector switch for either each outlet or one selector switch that controls all the outlets. The selector switch can control whether the outlets are powered directly be the input power, or if the outlets are controlled by the audio signal or sound. When the outlets are controlled by the audio signal or sound, the audio signal or sound can be filtered into a plurality of bands, one for each outlet, for example. There audio signal or sound can be input to the outlet strip by various mechanisms, including WiFi, Bluetooth®, FM wireless receiver, via an audio jack, via a microphone, or the like.

10 Claims, 4 Drawing Sheets

AUDIO SIGNAL CONTROL OF ELECTRICAL OUTLET STRIP

CROSS-REFERENCE TO RELATED APPLICATION

This application claims the benefit of priority of U.S. provisional application No. 61/821,050, filed May 8, 2013, the contents of which are herein incorporated by reference.

BACKGROUND OF THE INVENTION

The present invention relates to electrical outlet strips and, more particularly, to an electrical outlet strip that is controlled by music or sound.

There are many situations where it may be desired to control power output with an audio signal or sound. For example, lighting or strings of lights, such as those used for holiday lighting, are currently not easily controlled by an audio signal or sound.

In addition, there may be a need to control power output to multiple power outlets based on the characteristics of the sound. For example, one may desire to power on a first outlet when a low pitch is played and a separate outlet when a high pitch is played.

Computerized systems do exist for controlling lights based on sound, however, these systems are often expensive and complicated, often requiring an experienced program or someone that has background experience using the software and hardware.

As can be seen, there is a need for a device that can easily and simply provide power based on an audio signal input or sound.

SUMMARY OF THE INVENTION

In one aspect of the present invention, an electrical outlet strip comprises an audio signal input; a frequency divider dividing an audio signal received through the audio signal input into a plurality of audio bands; a plurality of relays, where the number of relays correspond to the number of the plurality of audio bands, each of the plurality of relays receiving one of the plurality of audio bands, where when the audio band contains a signal, the relay is closed to permit power to flow therethrough; a plurality of outlets receiving power through a first power signal or a second power signal, the first power signal controlled by the plurality of relays and the second power signal being delivered to the plurality of outlets directly from a power supply feeding power to the electrical outlet strip; and at least one selector switch, the at least one selector switch selecting whether each of the plurality of outlets receives power from the first power signal or the second power signal.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an electrical outlet strip that is controlled by sound or an audio signal. The electrical outlet strip can include a plurality of outlets having a selector switch for either each outlet or one selector switch that controls all the outlets. The selector switch can control whether the outlets are powered directly be the input power, or if the outlets are controlled by the audio signal or sound. When the outlets are controlled by the audio signal or sound, the audio signal or sound can be filtered into a plurality of bands, one for each outlet, for example. There audio signal or sound can be input to the outlet strip by various mechanisms, including WiFi, Bluetooth®, FM wireless receiver, via an audio jack, via a microphone, or the like.

The electrical outlet strip of the present invention does not require any wiring, special extra hardware, dedicated software, or the like. A user can simply plug in their items, such as holiday lighting, into one of the outlets, which can then be set to be controlled by an audio input signal or sound.

Figure 1:
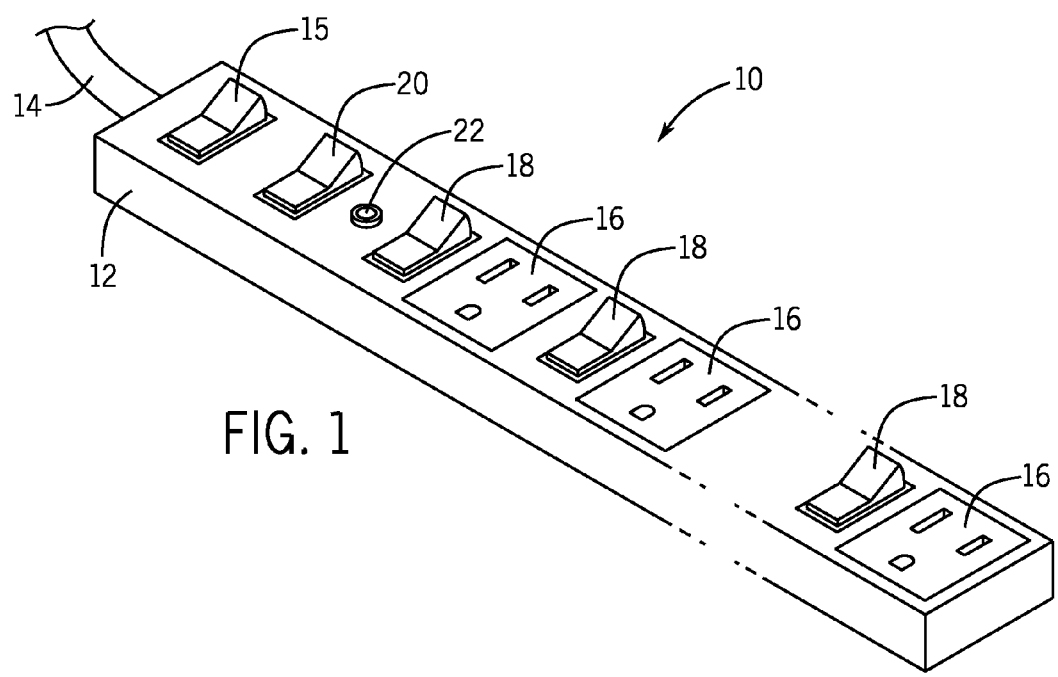
FIG. 1 is a perspective view of an audio signal controlled electrical outlet strip according to an exemplary embodiment of the present invention, where each outlet has its own separate selector switch.
Figure 2:
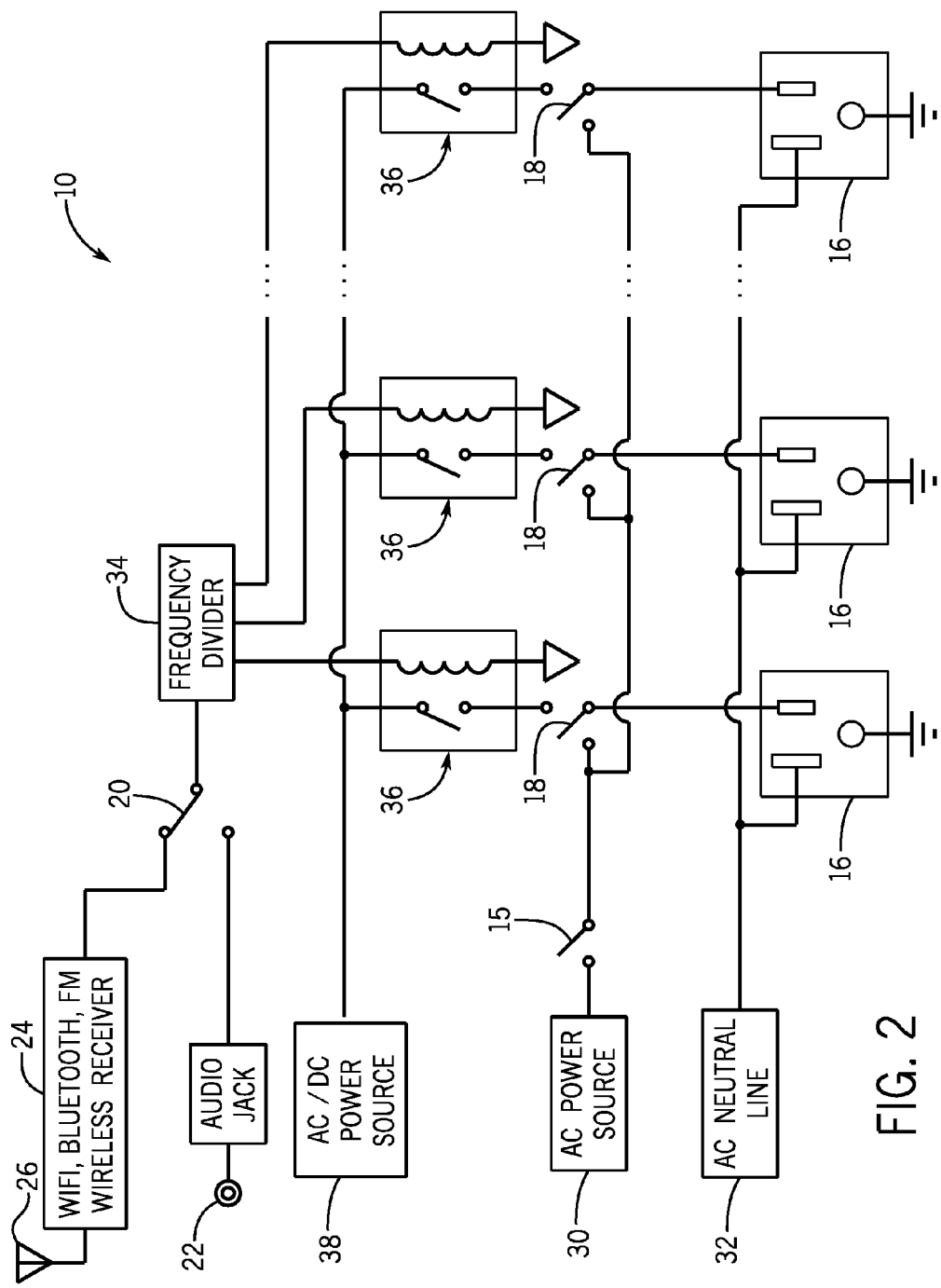
FIG. 2 is a schematic electrical diagram of the electrical outlet strip of FIG. 1.

Referring now to FIGS. 1 and 2, in one embodiment of the present invention, an outlet strip 10 can include an electrical cable 14 providing power to the outlet strip 10. The electrical cable 14 can, for example, be a cable having electrical conducting wires with a standard electrical plug (not shown) on the end.

The electrical plug at the end of the electrical cable 14 may be a standard, U.S., three-prong plug. In some embodiments, the electrical plug at the end of the electrical cable 14 may be designed to fit into electrical plugs from other countries.

A plurality of outlets 16 can be disposed in a housing 12. A plurality of switches, including a main power switch 15, an audio source selector switch, and a plurality of selector switches 18, can also be disposed in the housing 12. The outlets 16 can be standard, U.S., three-prong outlets. In some embodiments, the outlets 16 may be designed to receive plugs from other countries. The outlet strip 10 can be designed to be used in any country and be compatible with their electrical system, including the power voltage, frequency and the like.

As shown in FIG. 2, AC power from the electrical cable 14 can be divided into AC power source 38 and AC/DC power source 38. A main switch 15 may control the main power supply. The selector switches 18 can be single-pole, double-throw switches that can toggle power to the outlets 16 between the AC power source 30 or a switched power based on an audio signal or sound, as described below. An AC neutral line 32 may be delivered directly to each of the outlets 16.

An audio signal 24 or sound can be received into the outlet strip 10 via a wireless receiver 26. The audio signal 24 can be, for example, a WiFi received audio signal, a Bluetooth® received audio signal, an FM audio signal, or the like. In some embodiments, an audio jack 22, such as an RCA plug, a standard ¼-inch audio plug, or the like, can receive an audio signal. The audio source selector switch 20 can control from where the audio signal may be received. In the embodiment of FIG. 2, the audio source selector switch 20 may be a single-pole, double-throw switch. However, if additional inputs are available for the audio signal, the switch may include more than two throws.

The audio signal can pass into a frequency divider 34 that can separate the audio signal into a plurality of frequency bands. Typically the number of frequency bands will correspond to the number of outlets 16. However, in some embodiment, a single band may control power to any number of outlets.

The divided frequency bands can be delivered to a plurality of relays 36, where, when the selector switches 18 are disposed to cause the outlets 16 to be controlled by the audio signal or sound, and when the audio signal includes a signal in the given frequency band, the relay 36 can close, causing power to be delivered to that particular outlet 16. Thus, in the example shown in FIG. 2, one relay 36 may be triggered with low pitch audio frequencies (such as from about 20 Hz to about 600 Hz), another relay 36 may be triggered with mid-range frequencies (such as from about 600 Hz to about 2.4 KHz) and another relay 36 may be triggered with high frequencies (such as from about 2.4 KHz to about 20 KHz). Thus, one outlet may be powered by low frequencies, one outlet may be powered by mid-range frequencies, and the third outlet may be powered by high frequencies.

Figure 3:
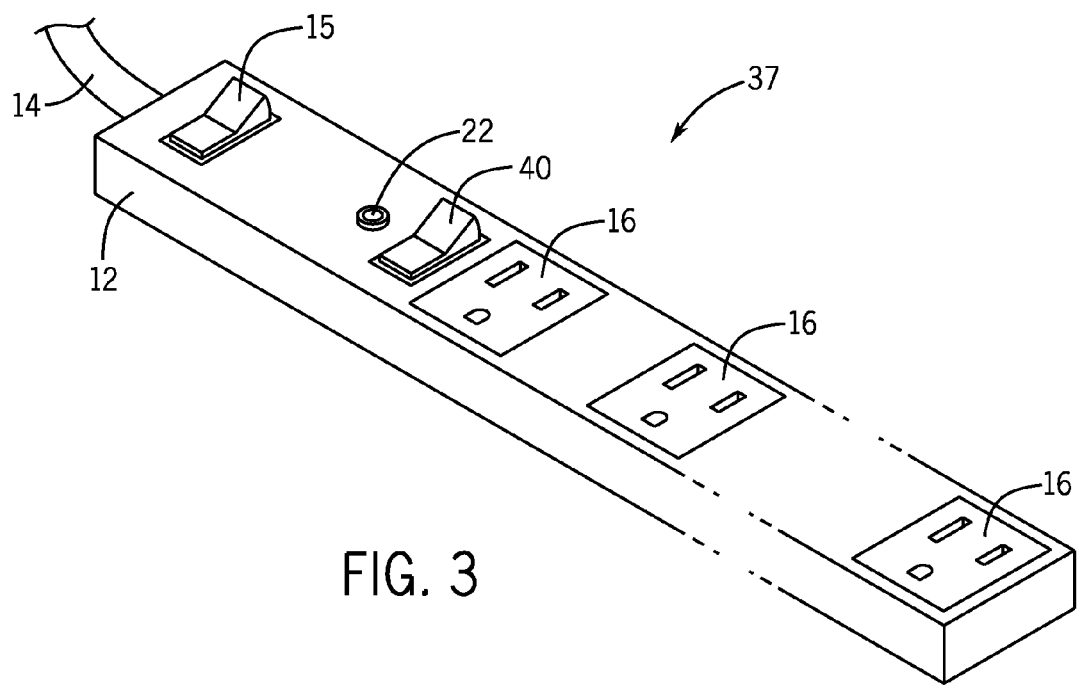
FIG. 3 is a perspective view of an audio signal controlled electrical outlet strip according to another exemplary embodiment of the present invention, where all outlets are controlled by one selector switch.
Figure 4:
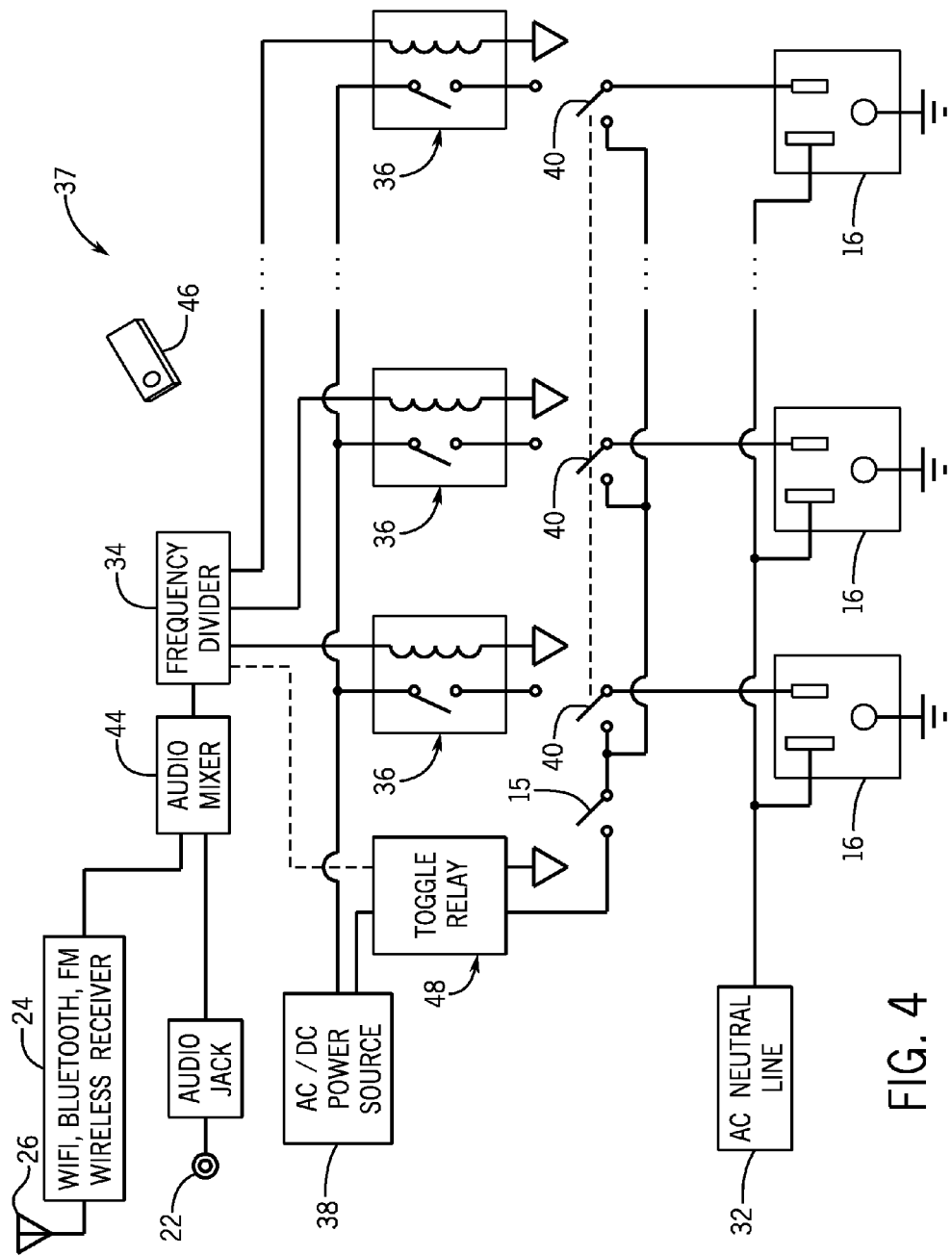
FIG. 4 is a schematic electrical diagram of the electrical outlet strip of FIG. 3.

Referring now to FIGS. 3 and 4, variations may be made to the outlet strip 10. While the embodiment of FIGS. 3 and 4 show several variations, as described below, the outlet strip 10 described above may contain one, several or all of these variations.

The outlet strip 37 of FIGS. 3 and 4 can include a single selector switch 40, where all of the outlets 16 are either controlled from the audio signal, or are always powered by the power source 38.

In some embodiments, the audio source selector switch 20, described above, can be replaced with an audio mixer 44. The audio mixer 44 can receive any and all audio signals from the various inputs, including the wireless input 26 and the audio jack(s) 22.

In some embodiments, a toggle relay 48 can be used to turn on and off the outlet strip 37. The toggle relay 48 may be controlled by, for example, a remote control 46. This may be especially useful for outdoor or remote lights, where a remote can be used to turn on and off power to the outlets 16 of the outlet strip 37.

While the above discussion refers to AC power, the design of the present invention can be used to drive DC powered devices as well. Also, while the above discussion focused on controlling lighting plugged into the outlets by an audio signal, the present invention may be tuned to any frequency to drive different machines. For example, one could tune the outlet strip to an alarm clock frequency to then power the outlet to turn on a coffee machine. As another example, one could tune the outlet strip to an animal sound so as to power, for example, an animal feeder.

It should be understood, of course, that the foregoing relates to exemplary embodiments of the invention and that modifications may be made without departing from the spirit and scope of the invention as set forth in the following claims.

What is claimed is:

1. An electrical outlet strip comprising:
   an audio signal input;
   a frequency divider dividing an audio signal received through the audio signal input into a plurality of audio bands;
   a plurality of relays, where the number of relays correspond to the number of the plurality of audio bands, each of the plurality of relays receiving one of the plurality of audio bands, where when the audio band contains a signal, the relay is closed to permit power to flow therethrough;
   a plurality of outlets receiving power through a first power signal or a second power signal, the first power signal controlled by the plurality of relays and the second power signal being delivered to the plurality of outlets directly from a power supply feeding power to the electrical outlet strip; and
   at least one selector switch, the at least one selector switch selecting whether each of the plurality of outlets receives power from the first power signal or the second power signal.

2. The electrical outlet strip of claim 1, wherein the number of outlets corresponds to the number of relays.

3. The electrical outlet strip of claim 1, wherein at least one selector switch includes one selector switch for each of the plurality of outlets.

4. The electrical outlet strip of claim 1, wherein the at least one selector switch includes one selector switch controlling all of the plurality of outlets.

5. The electrical outlet strip of claim 1, further comprising a main power switch controlling power delivered to the plurality of outlets.

6. The electrical outlet strip of claim 1, further comprising a toggle relay operable by a remote control to turn on and off the electrical outlet strip remotely.

7. The electrical outlet strip of claim 1, wherein the audio signal input includes at least one of a wireless audio signal input and an audio jack for a wired audio signal input.

8. The electrical outlet strip of claim 7, further comprising an audio source selector switch operable to switch between the wireless audio signal input and the audio jack.

9. The electrical outlet strip of claim 7, further comprising an audio mixer for mixing audio signals from either the wireless audio signal input, the audio jack, or both, to deliver the mixed audio signals to the frequency divider.

10. The electrical outlet strip of claim 1, wherein the plurality of outlets includes at least three outlets powered selectively by at least three different frequency bands.

* * * * *